United States Patent
Greenleaf et al.

(10) Patent No.: US 11,146,329 B1
(45) Date of Patent: Oct. 12, 2021

(54) SYSTEMS AND METHODS FOR MULTILINK AIRCRAFT COMMUNICATION

(71) Applicant: Rockwell Collins, Inc., Cedar Rapids, IA (US)

(72) Inventors: William T. Greenleaf, Indialantic, FL (US); Scott F. Bauler, Melbourne, FL (US); Neil J. Earnhardt, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/003,854

(22) Filed: Jun. 8, 2018

(51) Int. Cl.
*H04B 7/185* (2006.01)

(52) U.S. Cl.
CPC .............. *H04B 7/18515* (2013.01)

(58) Field of Classification Search
CPC ......... H04L 47/10; H04L 47/30; H04L 47/11; H04L 47/12; H04L 47/35; H04L 47/32; H04L 43/50; H04L 43/0852; H04L 43/08; H04W 40/02; H04W 40/24; H04W 40/34; H04W 24/00; H04B 17/003
USPC ..... 370/229, 235, 238, 252, 310.2, 328, 338
See application file for complete search history.

(56) References Cited

U.S. PATENT DOCUMENTS

| | | | | |
|---|---|---|---|---|
| 4,696,051 A * | 9/1987 | Breeden | ................. | H04H 20/67 375/356 |
| 6,122,514 A * | 9/2000 | Spaur | .................. | H04W 72/042 370/468 |
| 8,149,715 B1 * | 4/2012 | Goel | ...................... | H04L 45/123 370/238 |
| 8,566,012 B1 * | 10/2013 | Shafaat | ................ | G08G 5/0008 701/116 |
| 9,913,199 B1 * | 3/2018 | Bolling | .................. | H04W 40/34 |
| 2006/0155432 A1 * | 7/2006 | Brown | .................... | G01C 21/20 701/14 |
| 2008/0117858 A1 * | 5/2008 | Kauffman | .......... | H04B 7/18506 370/316 |
| 2010/0232295 A1 * | 9/2010 | True | .................... | H04B 7/18506 370/238 |
| 2010/0293292 A1 * | 11/2010 | Tamalet | ............. | H04B 7/18506 709/238 |
| 2015/0222351 A1 * | 8/2015 | Judd | ................... | H04B 7/18506 455/11.1 |
| 2017/0054490 A1 * | 2/2017 | Zeng | ................... | H04B 7/18506 |
| 2017/0324628 A1 * | 11/2017 | Dhanabalan | ............ | H04L 47/24 |
| 2018/0287692 A1 * | 10/2018 | Matyas | .............. | H04B 7/18508 |

OTHER PUBLICATIONS

U.S. Appl. No. 15/673,305, filed Aug. 9, 2017, Niraula et al.
(Continued)

*Primary Examiner* — Brenda H Pham
(74) *Attorney, Agent, or Firm* — Suiter Swantz pc llo (57) ABSTRACT

An aircraft communication system includes, and a method of aircraft communication uses, communication radios and a multilink communication controller. The multilink communication controller includes a link selection table and a link selector. The link selector is in communication with the link selection table. The link selector is configured to receive a message from a system of the aircraft and select a communication link among a number of communication links for the message using a priority of the message and priority information from the link selection table.

11 Claims, 4 Drawing Sheets

(56) References Cited

OTHER PUBLICATIONS

Universal-Radio, "ACARS Introduction", http://www.universal-radio-com/catalog/decoders/acarsweb.pdf 5 pages.
Rockwell Collins, "ARINC Aviation, Aircraft Communications Addressing and Reporting System", https://www.rockwellcollins.com/Services_and_Support/Information_Management/~/media/DA843DB0792946C58740F613328E5022.ashx, 3 pages.
Brain, Marshall, "How Web Servers Work", https://computer.howstuffworks.com/web-server1.htm, downloaded Oct. 9, 2017, 11 pages.
ITU; "Indtroduction to ASN.1"; http:www.itu.int/en/ITU-T/asn1/Pages/indtroduction.aspx; downloaded Aug. 9, 2017, 7 pages.
Joshi, Anish, "How TCP/IP protocol works", screenshot of youtube video, https://www.youtube.com/watch?v=8XNas3Nhh9, Aug. 5, 2016, 1 page.
Tyson, Jeff, "How Internet Infrastructure Works", howstuffworks, https://computer.howstuffworks.com/internet/basics/interrnet-infrastructure.htm, downloaded Oct. 9, 2017. 9 pages.
Uijt de Haad, Martin, EE6900 Flight Management Sysytems, "Aircraft Communications and Reporting System", https://web.archive.org/web/20161020231224/http://www.ohio.edu/people/uijtdeha/ee6900_fms_08_acars.pdf 20 pages.
Shichao's Notes, "UNP Chapter 2—The Transport Layer: TCP, UDP, and SCTP", https://notes.shichao.io/unp/ch/, downloaded Oct. 9, 2017, 12 pages.

\* cited by examiner

SYSTEMS AND METHODS FOR MULTILINK AIRCRAFT COMMUNICATION

BACKGROUND

Embodiments of the inventive concepts disclosed herein relate generally to the field of communication systems. More particularly, embodiments of the inventive concepts disclosed herein relate to communication systems for aircraft.

The flight crew and many avionics systems in aircraft communicate data to and from ground stations and other aircraft via various communication links. The communication link used for a message is manually chosen or predetermined based upon the message. If a chosen communication link is not capable of delivering the message, subsequent communication links are chosen in a serial fashion delaying message delivery. Examples of aircraft communications links include the aircraft communications addressing and reporting system (ACARS) network links, very high frequency (VHF) radio unit links, high frequency (HF) radio unit links, other radio unit links, satellite communication unit links, automatic dependent surveillance broadcast (ADS-B) network links and other network links. Communication links have differing constraints related to cost, available bandwidth, operational regions, interference, and effects due to ionospheric conditions. These constraints, are exacerbated by increased demands for low latency communications in airspace with higher densities of aircraft.

SUMMARY

In one aspect, the inventive concepts disclosed herein are directed to a multilink communication controller for an aircraft. The multilink communication controller includes a link selection table and a link selector. The link selector is in communication with the link selection table. The link selector is configured to receive a message from a system of the aircraft and select a communication link among a number of communication links for the message using a priority of the message and priority information from the link selection table.

In a further aspect, the inventive concepts disclosed herein relate a method of communication for an aircraft. The method includes receiving a message from a system of the aircraft and determining link quality associated with communication links between the aircraft and ground. The method also includes determining a priority of the message and selecting a link for the message in response to the link quality and the priority.

In a further aspect, the inventive concepts disclosed herein are directed to a communication system for an aircraft. The communication system includes an aircraft. The aircraft includes communication radios and a processing circuit. The processing circuit is configured to receive a message from a system of the aircraft and determine link quality associated with communication links. The processing circuit is also configured to select a communication link from the communication links associated with the communication radios using cost and link quality information and send the message to the ground message manager via the communication link using one of the communication radios.

BRIEF DESCRIPTION OF THE DRAWINGS

Implementations of the inventive concepts disclosed herein may be better understood when consideration is given to the following detailed description thereof. Such description makes reference to the appended drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the figures, systems and methods of integrated communications meet the increased demands for low latency communications in airspace with higher densities of aircraft in accordance with various aspects of the inventive concepts. The systems and methods advantageously provide modification of radio capabilities to provide dynamic performance measurements to a centralized supervisor/controller in some embodiments. The centralized supervisor/controller uses the dynamic performance measurements in conjunction with an expanded protocol with both radios and ground stations to determine which messages should be transmitted via which available link based on operational needs and link cost data for the current aircraft position in some embodiments. The link can be chosen in accordance with factors including but not limited to ownship navigation position, ADS-B In proximity traffic, and expanded message classification information in some embodiments. The systems and methods use the current position to command transmitter power output adjustments to improve spectrum usage efficiency in some embodiments.

The systems and methods described herein enable an aircraft to use an integrated communication system including a supervisory controller and multiple communication links to consolidate common operations across the communication links in the supervisory controller. The common operations include but are not limited to: built in test equipment (BITE), data load, and aircraft human machine interface (HMI) operations. In some embodiments, the integration associated with the systems and methods provides size, weight and power improvements for the overall communication system.

Figure 1:
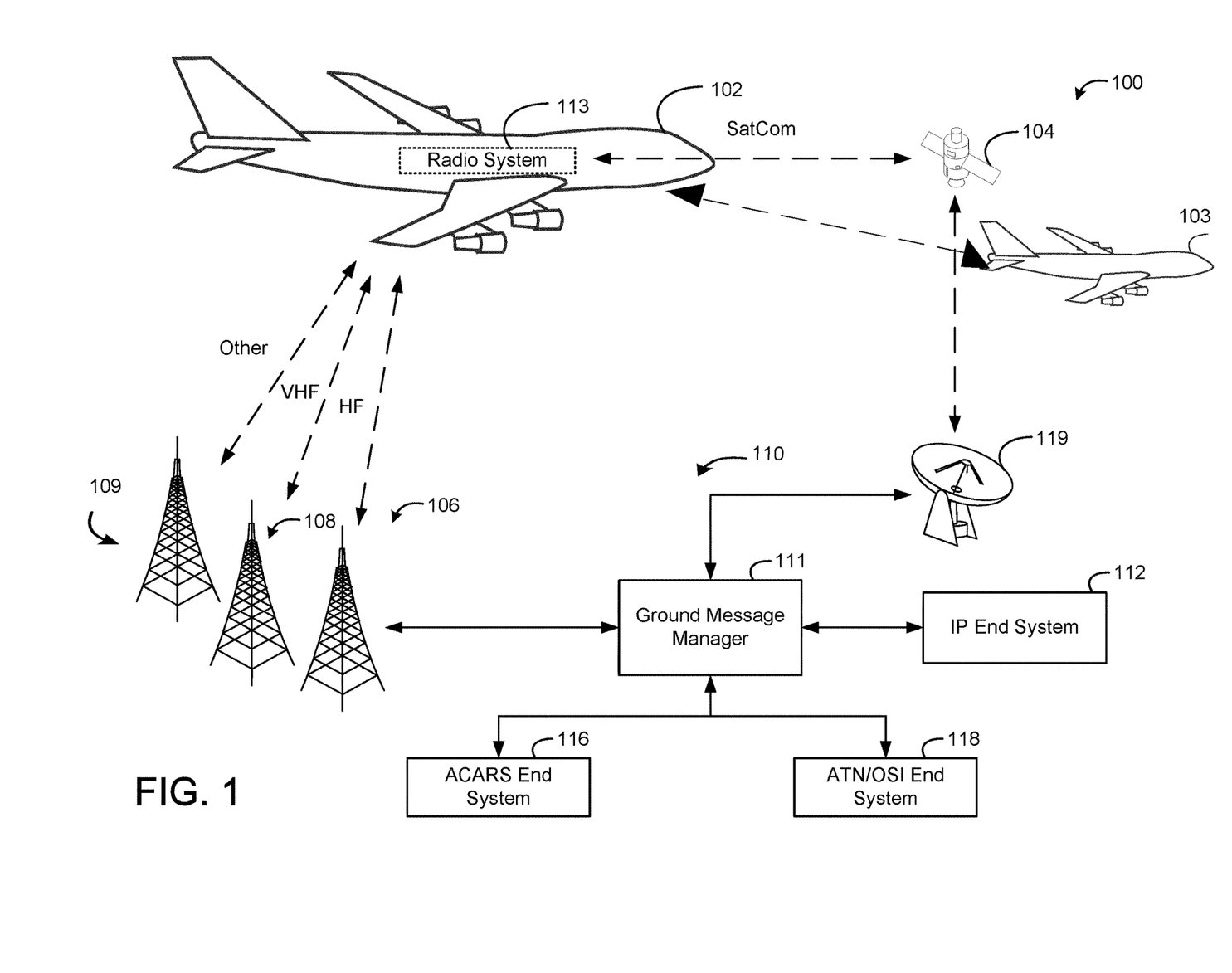
FIG. 1 is a schematic representation of a communication system for an aircraft according to exemplary aspects of the inventive concepts disclosed herein.

With reference to FIG. 1, a communication system 100 for an aircraft 102 includes a radio system or an onboard communication system 113 and a ground communication system 110 according to some exemplary embodiments. The radio communication system 100 can be configured to facilitate both Internet based communication and non-Internet based communication. The aircraft 102 communicates to the ground communication system 110 via ground based antennas 106, 108, and 109. The aircraft 102 communicates with a satellite 104 which may in turn communicate to/from a satellite dish or satellite antenna 119. The antennas 106, 108, 109, and 119 are associated with one or more processing circuits, mission data recorders (MDRs), remote transmitter receivers (RTRs), network interfaces, etc.

The onboard communication system 113 selects a communication link among available communication links for providing messages between the ground communication system 110 and the aircraft 102 in some embodiments. The communication link is selected using real time or near real time measurements of link quality or availability and message priority in some embodiments. In some embodiments, the communication link is selected based upon cost and priority.

The onboard communication system 113 also communicates with other aircraft, such as an aircraft 103. The onboard communication system 113 forms ad hoc networks with other aircraft. The onboard communication system 113 provides messages to the aircraft 103 for forwarding to other aircraft or ground via the aircraft 103 in some embodiments. In some embodiments, the aircraft 103 receives messages from the aircraft 102 and accumulates messages for an efficient download via a single communication link to the ground communication system 110. Such an operation is advantageous in crowded environments where bandwidth to the ground communication system 110 can be limited.

Both non-Internet messages (e.g., ACARS messages) and the messages with a protocol identifier (i.e., the Internet Messages with unique protocol identifiers) are communicated between the aircraft 102 and the ground communication system 110 in some embodiments. The ground communication system 110 includes a ground message manager 111 coupled to or in communication with an ACARS end system 116, an ATN/OSI end system 118, an internet protocol (IP) end system 112 or other network. The non-Internet messages are messages for the ACARS end system 116 or for the ATN/OSI end system 118 in some embodiments. The Internet messages with the unique protocol identifiers use transport layer protocols and Internet layer protocols to transmit messages to the IP end system 112, the ACARS end system 116, and/or the ATN/OSI end system 118 in some embodiments. Communication and operation of the onboard communication system 113 and the ground communication system 110 can occur according the protocols, pipelines, systems and methods discussed in U.S. patent application Ser. No. 15/673,305, entitled, "SYSTEMS AND METHODS FOR INTERNET BASED AIRCRAFT COMMUNICATION," invented by Niraula and assigned to the assignee of the present application, incorporated herein by reference in its entirety.

The message with the protocol identifier can include both a packet of data, i.e., the message, and a protocol identifier. The protocol identifier may allow both the onboard communication system 113 and the ground message manager 111 to identify a message as an Internet based message. The protocol identifier may be a particular piece of data, e.g., a header that is appended and/or pre-pended to the message. For example, a single byte, e.g., the Hexadecimal number 0x80 may be the protocol identifier. Any number or piece of data can be used as the protocol identifier.

Figure 2:
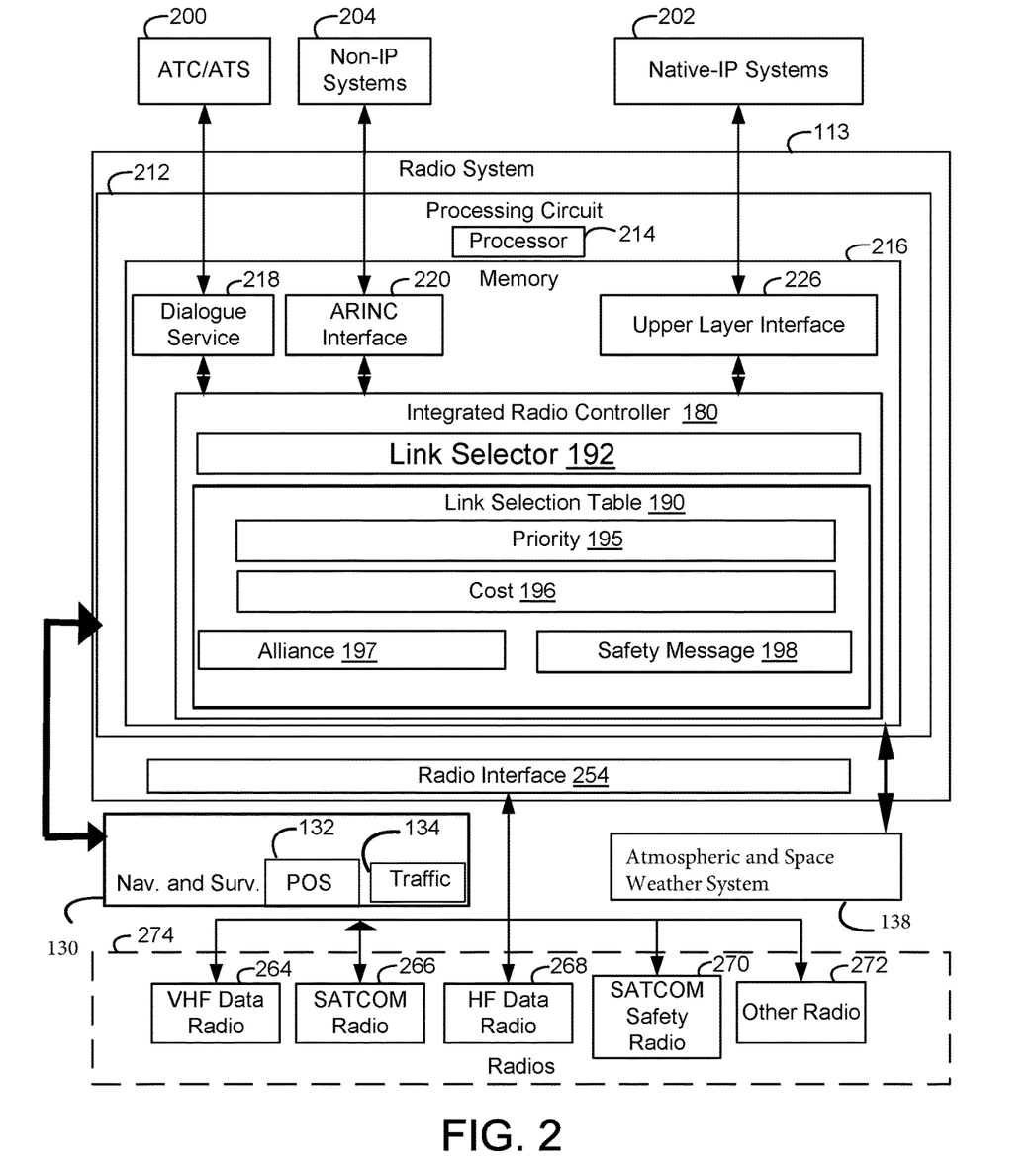
FIG. 2 is a schematic block diagram of the onboard communication system for the aircraft using the communication system illustrated in FIG. 1 according to exemplary aspects of the inventive concepts disclosed herein.

With reference to FIG. 2, the radio system or onboard communication system 113 includes an integrated radio controller 180, according to some exemplary embodiments. The integrated radio controller 180 is configured to communicate with an avionic system (e.g., an ATC/ATS 200, non-IP systems 204, and native-IP systems 202 (e.g., SWIM or other native-IP applications)) and systems of the aircraft 102 (FIG. 1). The integrated radio controller 180 receives a message to be transmitted off the aircraft 102 via a communication link from the avionic system and receives messages from the ground communication system 110 or aircraft 103 via a communication link. The message is an avionics control domain message, an aircraft information service domain message, or a passenger information and entertainment services domain message in some embodiments.

The integrated radio controller 180 is configured to send data or messages from aircraft subsystems, applications, and peripherals, i.e., the ATC/ATS 200, the non-IP systems 204, and the native-IP systems 202, as binary stream messages, using the transport layer protocols (e.g., UDP, SCTP, and/or TCP) and Internet layer protocols (e.g., IPv4 and/or IPv6). The integrated radio controller 180 communicates with radios 274 via a radio interface 254. The radios 274 include a VHF data radio 264 (e.g., a VHF Data Link Mode 2 radio), a SATCOM radio 266, an HF data radio 268, a SATCOM safety radio 270, and/or any other radio or communication link, as indicated by other radio 272. The binary stream messages can be transmitted by the integrated radio controller 180 via the radios 274 to the ground message manager 111 (FIG. 1).

The integrated radio controller 180 includes a processing circuit 212, a processor 214, and a memory 216. The processing circuit 212 includes at least one processor 214, which may be any type of general purpose or special purpose processor (e.g., FPGA, CPLD, ASIC). The processing circuit 212 also includes at least one memory 216, which may be any type of non-transitory computer or machine-readable storage medium (e.g., ROM, RAM, hard disk, flash memory) and includes modulation/demodulation circuits, interfaces, buffers, converters, and other circuitry.

The memory 216 includes a dialogue service 218 and an ARINC interface 220. The dialogue service 218 is configured to facilitate communicate between Air Traffic Control (ATC) and Air Traffic Service (ATS), i.e., the ATC/ATS 200, and the integrated radio controller 180. The ATC/ATS 200 are ATC and ATS applications or systems of the aircraft 102 in some embodiments. The ARINC interface 220 acts as an interface for ARINC based avionic systems and applications i.e., the non-IP systems 204 in some embodiments. The ARINC interface 220 may facilitate ARINC communication, e.g., ARINC 619, for communication between the integrated radio controller 180 and the non-IP systems 204.

The non-IP systems 204 may include Flight Management System (FMS), Aircraft Condition Monitoring System (ACMS), Cabin Management System (CMS), Airline Operational Control (AOC) based systems, Onboard Maintenance System (OMS), Digital Flight Acquisition System (DFADU), various peripherals, various cabin systems, and/or any other system that may not be natively an Internet system but rather communicate via ACARS or ATN/OSI. The non-IP systems 204 may communicate via ARINC 623, ARINC 619, and/or any other ARINC based communication protocol. The ARINC interface 220 can be configured to facilitate communicate between the integrated radio controller 180 and the non-IP systems 204.

Since the dialogue service 218 and the ARINC interface 220 facilitate communication between the integrated radio controller 180 and the ATC/ATS 200 and the non-IP systems 204, no existing systems (e.g., avionics) of the aircraft 102 would be replaced with Internet communication based systems (e.g., the native-IP systems 202) in some embodiments. In various embodiments, the avionics systems may receive software updates for properly communicating with the integrated radio controller 180.

An upper layer interface 226 can be configured to act as an interface for the native-IP systems 202. The upper layer interface 226 can be configured to receive messages for the native-IP systems 202 and provide the messages to the integrated radio controller 180. The integrated radio controller 180 can be configured to receive messages from the ATC/ATS 200, the non-IP systems 204, and/or the native-IP systems 202 (e.g., directly from the dialogue service 218, the ARINC interface 220, and/or the upper layer interface 226) and provide the messages to the various components of the integrated radio controller 180.

The memory 216 includes the integrated radio controller 180 which can perform operations described herein when executed by the processer 214. The integrated radio controller 180 includes a link selector 192 and a link selection table 190. The integrated radio controller 180 operates as an integrated message controller that communicates through the radio interface 254 with the radios 274. The integrated radio controller 180 performs airborne multi-link communication supervisory functions such that information or data from an aircraft navigation and surveillance system 130 is used to improve communications availability, latency, and spectral efficiency. The link selector 192 looks across the communication capabilities of the radios 274 and manages communication across all of the radios 274 to select or create an optimum communication link for the particular message independent of the flight crew to reduce workloads in some embodiments.

The link selection table 190 includes a priority table 195, a cost table 196, an alliance table 197, and a safety message table 198. The link selector 192 chooses a communication link using one or more of the radios 274 for a message received via the dialogue service 218, the ARINC interface 220, the upper layer interface 226 or other interface or aviation system.

The link selector 192 is configured to select between a number of communication links to transmit a message from the ATC/ATS 200, the non-IP systems 204, and the native-IP systems 202. In some embodiments, the communication links are the VHF data radio 264, the SATCOM radio 266, the HF data radio 268, the SATCOM safety radio 270, and the other radio 272. In various embodiments, the link selector 192 performs load balancing to select one or more of the radios 274 to transmit the message. The link selector 192 may select two or more of the radios 274 to send the same message. This may ensure data integrity and availability by creating redundancy in the transmitted messages.

The link selector 192 receives information from the navigation and surveillance system 130 and uses the information from the navigation and surveillance system 130 to help select the communication link. The information includes one or more of traffic identification, traffic location, and position of the aircraft 102. The navigation and surveillance system 130 can include a positioning receiver 132 and a traffic system 134. The positioning receiver 132 (e.g., global positioning system (GPS) receiver, inertial reference system, or other navigation system) provides position information of the aircraft 102 (FIG. 1). The traffic system 134 is an ADS-B or other system that can be utilized to provide the location and identification of other aircrafts such as the aircraft 103.

The link selector 192 also receives atmospheric weather information and space weather information from the atmospheric and space weather system 138. The atmospheric weather information can be provided by off aircraft sources or from an onboard weather system, e.g. weather radar, meteorology or uplink weather systems. The weather information can be provided from an off aircraft source. The weather information can be provided prior to departure or received while the aircraft 102 is enroute. The link selector 192 can use the position and weather information to select the most appropriate communication link in some embodiments. In some embodiments, the link selector 192 selects a communication link that does not utilize SATCOM radio 266 if the atmospheric and space weather system 138 indicates that interfering atmospheric weather or space weather may affect communications. In some embodiments, SATCOM radio 266 is chosen when a combination of atmospheric and space weather adversely impact the HF data radio 268. Under some other combinations the HF data radio 268 may be selected instead of the SATCOM radio 266.

Link selector 192 chooses the communication link using information from the link selection table 190 in some embodiments. The communication link can be chosen from a set of communication links using any of the radios 274. In some embodiments, the link selector 192 determines in real time or near real time the link quality associated with each of the links in order to select the most appropriate communication link for the message in some embodiments. If the required communication performance (RCP) for the message as provided in the message identification dictates that simulcasting is necessary to meet the message RCP, link selector 192 can select multiple links for simulcasting the message. The link selector 192 can choose whether data delivery performance or cost performance is most important based upon the type of message.

The link selector 192 can communicate via the radio interface 254 with the radios 274 to determine communication statistics associated with each communication link in some embodiments. For example, quality of service metrics (QoS) can be utilized. The quality of service metrics include but are not limited to: signal-to-noise ratio (SNR) in both communication directions (e.g. air-to-ground and ground-to-air), noise floor or interference, current period message completion statistics (e.g. delivery success rate), current health of the radio for air or ground, transmit output power level (degraded performance), current message delivery latency, current ground station loading and availability, and current channel congestion. Quality of service parameters or metrics are measured and tracked for each of the radios 274 by the integrated radio controller 180 in some embodiments. Various methods can be utilized to provide the quality of service metrics. Digital noise can be measured without a signal coming in. Measurements can occur both at the ground communication system 110 and onboard the aircraft 102, and measured parameters can be exchanged between the aircraft 102 and the ground communication system 110.

The link selector 192 also determines message identification information including avionics control domain message identification, aircraft information service domain message identification, and passenger information and entertainment services domain message identification. In some embodiments, the identification of the message includes the size and complexity of the message as well as its criticality. The size, the complexity and criticality can be used to select a communication link. For example, the link selector 192 selects a higher quality link for larger size, higher complexity, and higher criticality messages. In some embodiments, the link selector 192 selects a lower cost link per byte for a lower priority, large sized message.

Priorities for such messages can be assigned via the priority table 195 for determining which communication link to select. In some embodiments, the priority table 195 provides data correlating priority of the message with quality of service measure so that the link with the appropriate quality of service is selected for the priority. The priority level of a message is associated with the type of message in the message identification in some embodiments. For example, air traffic control messages receive the highest priority while messages related to passenger emails and phone calls are at a lower priority.

The link selector 192 utilizes aircraft current position including latitude, longitude, altitude, speed, and course to choose the communication link. In addition, the link selector 192 utilizes traffic information from the traffic system 134 to determine what aircraft are within specific distances from aircraft 102 and including identification of the aircraft as being part of an alliance or not. The alliance table 197 can be utilized to determine if an aircraft should use a particular air-to-air link based upon contracts associated with an alliance between airlines or airline contracts with service providers.

The cost table 196 includes cost information associated with each communication link. The cost can be a factor in choosing the communication link. For example, if two links have the same quality of service, the less expensive link is chosen. In some embodiments, larger messages are provided using the communication link that has sufficient capacity and costs the least per byte.

In some embodiments, the link selector 192 defines the transmit power output levels based upon the current position as provided by the positioning receiver 132 and the message type being transmitted. The power level is set according to range to the aircraft 103 for interaircraft communications and according to range to the antennas 106, 108, and 109 in aircraft-to-ground communications. The link selector 192 controls the radios 274 for the selected link to adjust the transmit output power levels to improve spectral efficiency. In some embodiments, the link selector 192 can select multiple links on a given band or use links on multiple data bands to maximize performance of the communication system 100 in terms of latency, integrity, and availability.

The link selector 192 utilizes the alliance table 197 and the safety message table 198 to synchronize messages with other aircraft through a self-forming network in some embodiments. The self-forming network is formed using information within the tables 197 and 198 as a predetermined set of conditions to control and allocate cost of messages in some embodiments. For example, an aircraft from one airline can talk to aircraft from that same airline and allied airlines and exclude other aircraft except for identified safety messages.

The integrated radio controller 180 communicates with the ground message manager 111 as a master, while the ground message manager 111 operates as a slave in some embodiments. However, the integrated radio controller 180 can be in a slave relationship with the ground communication system 110 in some embodiments. In some embodiments, the ground communication system 110 includes an integrated radio controller similar to the integrated radio controller 180.

In some embodiments, the link selection table 190 can include historical uses of links for particular messages. Using the information from link selection table 190, the link selector 192 can choose a link for the message according to its historically used communication link.

In some embodiments, the integrated radio controller 180 includes a manager for the VHF data radio 264. The manager can implement an ARINC protocol, e.g., ARINC 750. In some embodiments, the VHF data radio 264 communicates with the manager via the radio interface 254. The VHF data radio 264 may communicate via ARINC 429 with the radio interface 254. The manager can be configured to communicate via ARINC 429 with the VHF data radio 264.

In some embodiments, the integrated radio controller 180 can be configured to process all data to be sent or received via the SATCOM radio 266 and can be configured to process all data to be sent or received via the SATCOM safety radio 270. In some embodiments, the integrated radio controller 180 can be configured to process data to be sent or received via the HF data radio 268 and can be configured to process any data to be sent or received via the other radio 272.

The radio interface 254 may be the physical interface by which the integrated radio controller 180 communicates with the radios 274. The radio interface 254 may facilitate any kind of ARINC communication (e.g., ARINC 429) or Ethernet communication to allow the radios 274 to communicate with the integrated radio controller 180. The radio interface 254 may include one or more circuits and/or connections that electrically connect the radios 274 to the integrated radio controller 180.

Figure 3:
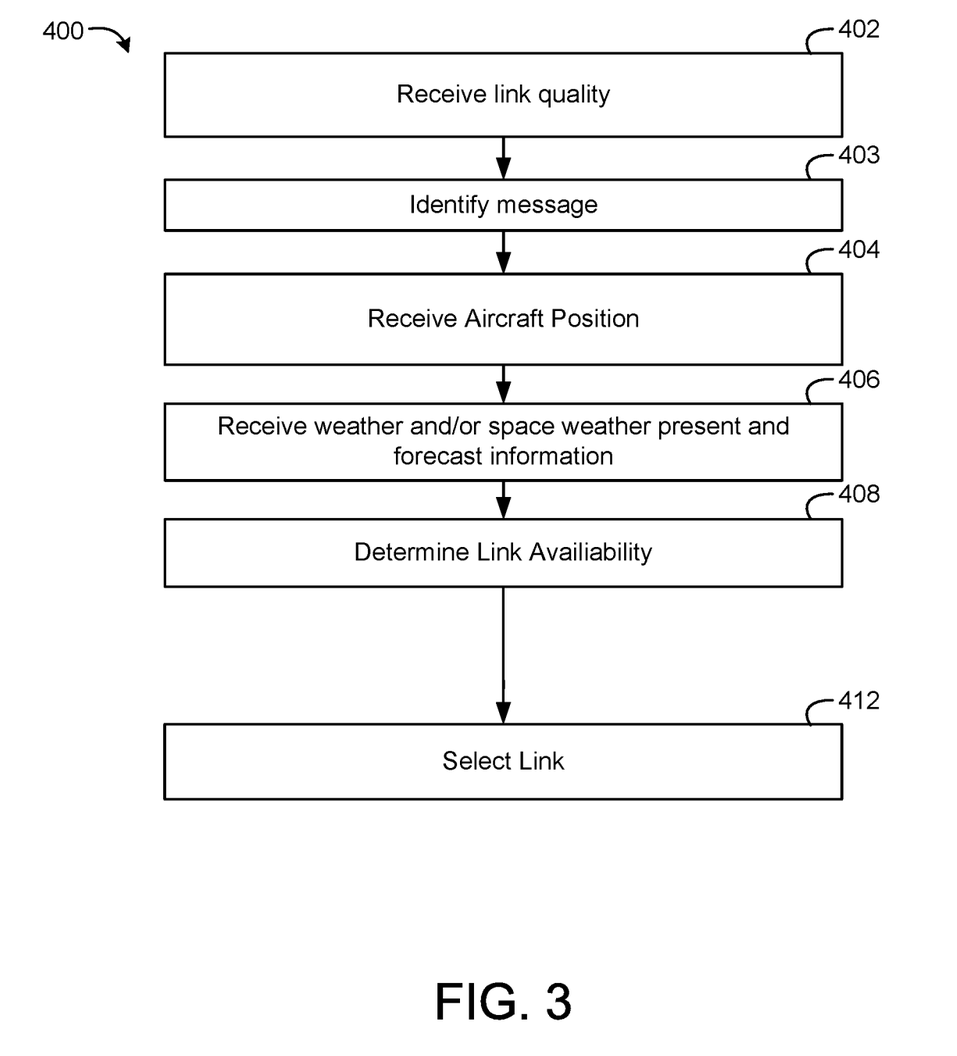
FIG. 3 is a flow diagram of a flow for operations of the onboard communication system illustrated in FIG. 2 according to exemplary aspects of the inventive concepts disclosed herein.

With reference to FIG. 3, an exemplary flow 400 of the operation of the link selector 192 includes an operation 402. At the operation 402, the link quality for a set of links is received. At an operation 403, a message is identified for transmission. At an operation 404, the aircraft position is received. At an operation 406, atmospheric and/or space weather is received. The atmospheric and space weather can be a present observation for the location of the aircraft as well as a forecast. The timing and location of the weather according to the present observation and forecast information can be used utilized to select an appropriate link.

At an operation 408, link availability or quality of service is determined. At an operation 412, the link is selected according to: quality of service, priority and cost; weather, priority, cost, and message identification; message identification and priority; quality of service, priority, aircraft positon, and cost; weather, priority, cost, quality of service, and message identification; weather, priority, cost, quality of service, alliances; priority, cost, quality of service, location and weather; priority, cost, quality of service, and safety message status; weather, priority, cost, quality of service, and safety message status; priority, cost, quality of service, and safety message status. The above criteria are exemplary. Other combinations, sub-combinations, and additional parameters can be utilized to select the link in some embodiments.

Figure 4:
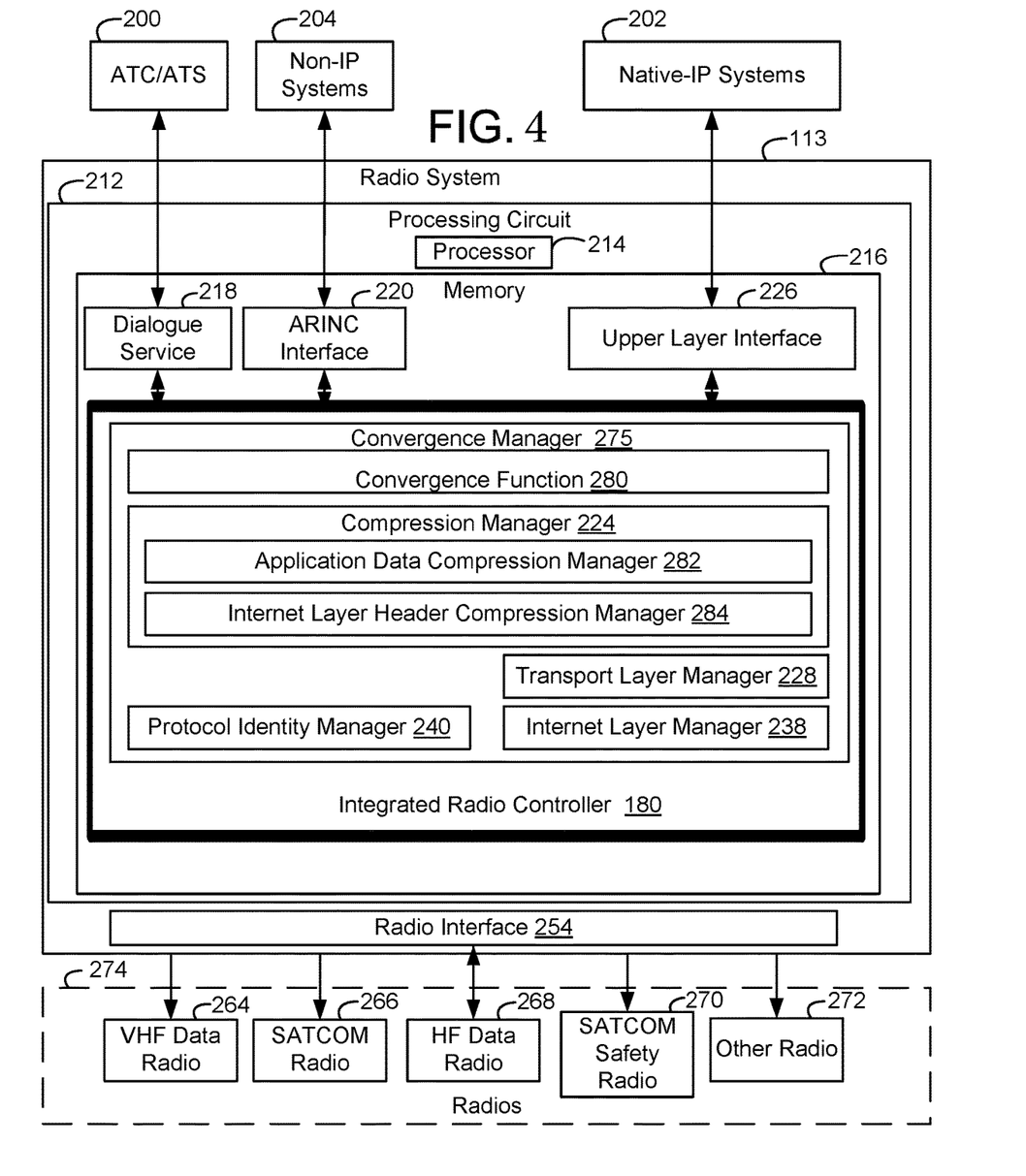
FIG. 4 is a schematic block diagram of the onboard communication system for the aircraft illustrated in FIG. 2 in greater detail according to exemplary aspects of the inventive concepts disclosed herein.

With reference to FIG. 4, the integrated radio controller 180 includes a convergence manager 275, according to some exemplary embodiments. The convergence manager 275 includes a convergence function 280. The convergence function 280 can be configured to receive messages from the ATC/ATS 200, the non-IP systems 204, and/or the native-IP systems 202, e.g., from the dialogue service 218, ARINC interface 220, and/or upper layer interface 226. The convergence function 280 can be configured to perform any data conversion necessary to prepare the message to be encapsulated as a transport layer segment and/or Internet layer packet to be sent to the ground message manager 111 via the selected communication link. Further, the convergence function 280 can be configured to convert any messages received from the ground message manager 111 into a format that can be provided to the ATC/ATS 200, the non-IP systems 204, and/or the native-IP systems 202.

The convergence function 280 can be configured to pack the received messages into Abstract Syntax Notation One (ASN.1) format. Specifically, the convergence function 280 can be configured to pack messages that the application data compression manager 282 has compressed into ASN.1 format. ASN.1 is a formal notation used for describing data transmitted by telecommunications protocols, regardless of language implementation and physical representation of data. This may allow the convergence function 280 to convert messages from an IP message format, an ACARS message format, and/or an ATN/OSI message format to a particular ASN.1 format. Further, the convergence function 280 can be configured to convert the ASN.1 message to an IP message format, an ACARS message format, and/or an ATN/OSI message format.

The ground message manager 111 can be configured to perform the same functionality as the convergence function 280. Any ACARS, ATN/OSI, or IP based messages that the ground message manager 111 sends to the aircraft 102 can be converted into an ASN.1 format by the ground message manager 111. The ground message manager 111 can be configured to convert received messages from the aircraft 102 (FIG. 1) that are in the ASN.1 format to an end destination format, e.g., into an ATN/OSI message format if the message is destined for the ATN/OSI end system 118, into an ACARS message format if the message is destined for the ACARS end system 116, etc.

The convergence manager 275 is shown to include a compression manager 224. The compression manager 224 can be configured to compress and/or decompress various messages and/or pieces of data. The compression manager 224 can be configured to use any kind of lossy or lossless compression algorithm to compress various messages (e.g., RFC 3173, RFC3749, RFC 4994, etc.). The compression manager 224 can be configured to compress any messages received from the ATC/ATS 200, the non-IP systems 204, and/or the native-IP systems 202. The compression manager 224 can be configured to compress any transport layer segment or datagram generated by a transport layer manager 228 and can further be configured to compress any Internet layer data packet generated by an Internet layer manager 238. The compression manager 224 can further be configured to perform any kind of transport layer or Internet layer header compression or decompression.

The compression manager 224 is shown to include application data compression manager 282 and Internet layer header compression manager 284. The application data compression manager 282 and the Internet layer header compression manager 284 can be configured to perform specific compression and/or decompression functions of compression manager 224. For example, the application data compression manager 282 can be configured to compress any data that the convergence manager 275 receives from ATC/ATS 200, non-IP systems 204, and/or native-IP systems 202. Further, the application data compression manager 282 can be configured to decompress any messages that the convergence manager 275 receives from the ground station or ground communication system 110. Specifically, if the convergence manager 275 receives an Internet layer packet from the ground message manager 111, the application data compression manager 282 can be configured to decompress the data of the transport layer segment.

The application data compression manager 224 can be configured to compress selectively the messages it receives. For example, the application data compression manager 224 can be configured to compress the received message and then compare the size of the compressed message to the size of the uncompressed version of the message. If the application data compression manager 224 determines that the size of the uncompressed message is smaller than the size of the compressed message (or in some embodiments the same size), the application data compression manager 224 can be configured to forego compressing the message. In response to determining that the compressed message is smaller than the uncompressed message, the application data compression manager 224 can be configured to retain the compressed version of the message and set an indication in the message that identifies that the message is compressed. Received messages may have an identifier that identifies whether the message is compressed or uncompressed. Based on the identifier, the application data compression manager 282 can be configured to determine whether decompression of the received message is necessary. In response to determining that decompression is necessary, the application data compression manager 282 can be configured to perform decompression. In response to determining that decompression is unnecessary, the application data compression manager 282 can be configured to forego decompression.

The data that the application data compression manager 282 either compresses or decompresses can be formatted by the convergence function 280. The convergence function 280 can format the message into an ASN.1 format before the message is encapsulated as a transport layer segment and an Internet layer packet. Other formats can be utilized. The ASN.1 formatted message may include the identifier (e.g., a flag) which identifies whether the message of the ASN.1 formatted message is compressed or was left uncompressed. This allows the receiving system (e.g., the ground message manager 111) to determine whether to compress or decompress the received message. The ground message manager 111, specifically, the application data compression manager 282 can be configured to perform some and/or all of the functionality of the application data compression manager 282. Specifically, the application data compression manager 282 can be configured to determine whether to compress or decompress messages.

The Internet layer header compression manager 284 can be configured to perform compression and/or decompression of Internet layer headers that will be transmitted to and/or received from the ground message manager 111. Specifically, the Internet layer header compression manager 284 can be configured to compress and/or decompress Internet layer headers included in the Internet layer packets. For example, the Internet layer header compression manager 284 can perform various header compression and decompression methods e.g., RFC 3095 and/or any other header compression and decompression method. Any Internet layer packet that the convergence manager 275 is sending to the ground message manager 111 that includes a header can be compressed by the Internet layer header compression manager 284. Similarly, any Internet layer packet that includes an Internet layer header that is received by convergence manager 275 from ground message manager 111 can have its Internet layer header decompressed by the Internet layer header compression manager 284.

The transport layer manager 228 can be configured to perform transport layer protocols (e.g., TCP, SCTP, UDP, etc.). The transport layer manager 228 can be configured to utilize port numbers for the ATC/ATS 200, the non-IP systems 204, and/or the native-IP systems 202 to facilitate communication between the ATC/ATS 200, the non-IP systems 204, and/or the native-IP systems 202 and the ground message manager 111. The transport layer manager 228 can be configured to add a port number to any message to be sent to the ground message manager 111. The transport layer manager 228 may store one or more lookup tables or other data structures, e.g., Table 1, which indicate port numbers associated with various systems of the aircraft 102 (e.g., the ATC/ATS 200, the non-IP systems 204, the native-IP systems 202) and systems on the ground (e.g., the IP end system 112, the ACARS end system 116, the ATN/OSI end system 118). The port number may identify particular systems or may otherwise identify a type of data. Table 1 indicates exemplary transport layer port numbers and associated services. The port numbers are provided as examples only. The transport layer ports may be any transport layer port e.g., UDP port, TCP port, and/or SCTP port.

TABLE 1

Port Number And Services

| Service Name | Port Number |
| --- | --- |
| Authentication | 63300 |
| Airline Operational Control (AOC)/ACARS End System | 63301 |
| Aeronautical Telecommunication Network (ATN) CM | 63302 |
| ATN Controller-Pilot Data Link Communications (CPDLC) | 63303 |
| ATN Automatic Dependent Surveillance-Contract (ADS-C) | 63304 |
| Future Air Navigation System (FANS) CPDLC | 63305 |
| FANS ADS-C | 63306 |
| FANS AFN | 63307 |
| ARINC 623 (ATS, etc.) | 63308 |
| Other Applications (e.g., Native Internet Based Applications) | All Other Ports |

As an example, the convergence manager 275 may receive a message from the radios 274. A protocol identity manager 240 may identify, via a protocol identifier included in the message, that the message is an Internet based message. The transport layer manager 228 can determine, via a port number included in a transport layer segment of the Internet based message, that the message is destined for a particular system. For example, if the port number is 63301, the transport layer manager 228 may determine that the message is Airline Operational Control (AOC)/ACARS and may provide the AOC/ACARS message to a system (e.g., the non-IP systems 204) that manages AOC/ACARS messages.

The transport layer manager 228 can be configured to encapsulate a message received from the ATC/ATS 200, the non-IP systems 204, and the native-IP systems as UDP datagrams, SCTP datagrams, or TCP segments and/or compressed by the compression manager 224. Encapsulating the message as a transport layer packet may include adding a transport layer header (e.g., a UDP header, a SCTP header, a TCP header). Encapsulating the message may include, for the example of UDP, adding a source port number (e.g., a port number as in Table 1), a destination port number (e.g., a port number as in Table 1), a length indicator, and/or a checksum. The terms segments and datagrams may be used interchangeably herein to refer to transport layer data. The transport layer manager 228 may be configured to facilitate other transport layer protocols e.g., UDP-Lite, Multipath TCP, Datagram Congestion Control Protocol (DCCP), and/or Reliable User Datagram Protocol (RUDP).

The Internet layer manager 238 can be configured to perform all Internet layer protocols. In some embodiments, the Internet layer manager 238 can be configured to encapsulate any UDP datagram, SCTP datagram, or TCP segment into an Internet protocol layer packet. In some embodiments, the Internet protocol layer packet is an IPv4 packet, an IPv6 packet, and/or any other Internet layer packet. The Internet layer manager 238 can be configured to add a network address (e.g., an IP address) to the datagram or segment received from the transport layer manager 228 that identifies a network that the message needs to be delivered to, the network being the network that includes the particular port number as identified by the datagram or segment. Encapsulating data as an Internet layer packet may include adding an Internet layer header to the data. For the example of IPv6, encapsulating data may include adding a version identifier, a traffic class identifier, a flow label, a payload length, a next header, a hop limit, a source address, and a destination address.

The protocol identity manager 240 can be configured to add a protocol identifier to the Internet layer packet generated by the Internet layer manager 238. In some embodiments, the protocol identifier is appended and/or prepended to the Internet layer packet. The protocol identifier may be a number or value, e.g., 0x80. This may identify the Internet layer packet as an Internet based message. Further, the protocol identity manager 240 can be configured to identify a protocol identifier included in a message received from the radios 274, i.e., from the ground message manager 111.

While the present disclosure describes systems and methods implementable for an aircraft or airborne platform, the inventive concepts disclosed herein may be used in any type of application or environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system, etc.). The inventive concepts disclosed herein may be used for training, simulation, and testing exercises to be performed with autonomous vehicles, including during development of autonomous vehicles. In some embodiments, the systems are included in or communicatively coupled to a navigation system, surveillance system, or autopilot system of the platform, including unmanned vehicles and autonomous vehicles, in some embodiments.

The scope of this disclosure should be determined by the claims, their legal equivalents and the fact that it fully encompasses other embodiments, which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A multilink communication controller for an aircraft, the multilink communication controller comprising:
   a link selection table; and
   a link selector in communication with the link selection table, the link selector being configured to:
   receive a message from a system of the aircraft;
   determine signal-to-noise ratios in both communication directions for each of a plurality of communication links between the aircraft and ground, wherein the communication links are provided using at least one of: a very high frequency (VHF) radio, a satellite communication (SATCOM) radio, and a high frequency (HF) radio;
   determine a priority of the message;
   and select a communication link among the plurality of communication links for the message using the priority of the message and the signal-to-noise ratios in both communication directions for each of the plurality of communication links from the link selection table,
   determine required communication performance for the message, and
   provide the message across more than one of the communication links in response to the required communication performance, wherein the communication links are used to communicate the message across more than one data band.

2. The multilink communication controller of claim 1, wherein the link selector provides a power level for a transmission of the message.

3. The multilink communication controller of claim 2, wherein the power level is chosen in response to a position of the aircraft.

4. The multilink communication controller of claim 3, wherein the position comprises latitude, longitude, altitude, and attitude of the aircraft.

5. The multilink communication controller of claim 1, wherein the link selector is configured to select the communication link for the message using atmospheric weather information.

6. The multilink communication controller of claim 1, wherein the link selector is configured to select the communication link for the message using space weather information.

7. The multilink communication controller of claim 1, wherein the link selection table comprises a cost table, an alliance table, and a safety message table.

8. A multilink communication controller for an aircraft, the multilink communication controller comprising:
   a link selection table; and
   a processor configured to:
   receive a message from a system of the aircraft;
   determine signal-to-noise ratios in both communication directions for each of a plurality of communication links between the aircraft and ground, wherein the communication links are provided using at least one of: a very high frequency (VHF) radio, a satellite communication (SATCOM) radio, and a high frequency (HF) radio;
   determine a priority of the message;
   select a communication link for the message in response to the signal-to-noise ratios in both communication directions for each of the plurality of communication links and the priority using the link selection table;

determine required communication performance for the message; and provide the message as a simulcast message across more than one of the communication links in response to the required communication performance, wherein the communication links comprise more than one data band.

9. The multilink communication controller of claim 8, wherein the processor is configured to:

use delivery constraints associated with the communication links to select the communication link, wherein the delivery constraints are related to contractual terms associated with the communication links.

10. The multilink communication controller of claim 9, wherein the communication link is selected even if one of the delivery constraints indicates the communication link should not be elected if the message is an emergency level message.

11. A non-transitory computer readable medium having stored thereon software instructions that, when executed by a processor, cause the processor to control a communication for an aircraft by executing steps comprising:

receiving a message from a system of the aircraft;

determining signal-to-noise ratios in both communication directions associated with a plurality of communication links between the aircraft and ground, wherein the communication links are provided using at least one of: a very high frequency (VHF) radio, a satellite communication (SATCOM) radio, and a high frequency (HF) radio;

determining a priority of the message;

selecting a communication link for the message in response to the signal-to-noise ratios in both communication directions for each of the plurality of communication links and the priority using a link selection table;

determining required communication performance for the message; and providing the message as a simulcast message across more than one of the communication links in response to the required communication performance, wherein the communication links comprise more than one data band.

\* \* \* \* \*